United States Patent
Hutchison et al.

(10) Patent No.: US 10,430,285 B2
(45) Date of Patent: Oct. 1, 2019

(54) BACKING UP METADATA

(71) Applicant: International Business Machines Corporation, Armonk, NY (US)

(72) Inventors: Gordon D. Hutchison, Eastleigh (GB); Miles Mulholland, Chandlers Ford (GB); Lee J. Sanders, Chichester (GB); Ben Sasson, North Baddesley (GB)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 15/435,661

(22) Filed: Feb. 17, 2017

(65) Prior Publication Data
US 2018/0239674 A1    Aug. 23, 2018

(51) Int. Cl.
*G06F 7/00* (2006.01)
*G06F 11/14* (2006.01)
*G06F 16/11* (2019.01)

(52) U.S. Cl.
CPC ........ *G06F 11/1451* (2013.01); *G06F 16/113* (2019.01); *G06F 2201/84* (2013.01)

(58) Field of Classification Search
CPC .............. G06F 11/1451; G06F 16/113; G06F 2201/84; G06F 2211/104; G06F 2212/466; G06F 2212/7207
USPC .................................. 707/649, 640, 639, 651
See application file for complete search history.

(56) References Cited

U.S. PATENT DOCUMENTS

| | | | |
|---|---|---|---|
| 7,433,898 B1 * | 10/2008 | Georgiev | G06F 11/203 |
| 7,680,836 B2 * | 3/2010 | Anderson | G06F 16/174 |
| | | | 707/999.202 |
| 8,281,093 B1 * | 10/2012 | Krishnan | G06F 11/1469 |
| | | | 711/162 |
| 8,356,148 B2 | 1/2013 | Popovski | |
| 8,533,410 B1 | 9/2013 | Corbett et al. | |
| 8,612,382 B1 * | 12/2013 | Patel | G06F 11/0727 |
| | | | 707/609 |

(Continued)

OTHER PUBLICATIONS

"Using Snapshots to Manage Metadata", Oracle help center, https://docs.oracle.com/cd/E11882_01/owb.112/e17130/content_mgmt.htm#WBINS10000, Jan. 2017, 18 pages.

(Continued)

*Primary Examiner* — Mohammed R Uddin
(74) *Attorney, Agent, or Firm* — Francis Lammes; Stephen J. Walder, Jr.; Robert M. Sullivan (57) ABSTRACT

A mechanism is provided for backing up metadata in a data storage system. Given metadata stored on the data storage system is implemented by way of a tree structure operable by fixed mapping. A stream of snapshots is taken of leaves in the metadata tree structure of given metadata stored on persistent data storage. The metadata tree structure of the given metadata stored on the persistent data storage is reconstructed on a basis of the stream of snapshots taken for backing up the given metadata stored on the persistent data storage. A journal over the reconstructed metadata tree structure is then replayed. In response to a given status discrepancy being flagged in respect of any given metadata, the status of a given leaf corresponding thereto in the reconstructed data tree structure is modified for consistency with the corresponding journal entry in the journal for that given metadata.

20 Claims, 6 Drawing Sheets

(56) References Cited

U.S. PATENT DOCUMENTS

| | | | |
|---|---|---|---|
| 8,661,068 B1* | 2/2014 | Seibel | G06F 16/172 707/825 |
| 8,793,451 B2 | 7/2014 | Goodman et al. | |
| 8,806,154 B1* | 8/2014 | Gupta | G06F 11/1448 711/156 |
| 8,818,951 B1* | 8/2014 | Muntz | G06F 11/1458 707/639 |
| 8,996,797 B1* | 3/2015 | Zheng | G06F 3/0685 711/103 |
| 9,043,280 B1* | 5/2015 | Patwardhan | G06F 11/1446 707/640 |
| 9,141,290 B2 | 9/2015 | Hallak et al. | |
| 9,235,479 B1 | 1/2016 | Muntz et al. | |
| 9,507,843 B1* | 11/2016 | Madhavarapu | G06F 16/2358 |
| 9,959,074 B1* | 5/2018 | Shain | G06F 15/17331 |
| 2003/0097611 A1* | 5/2003 | Delaney | G06F 16/10 714/13 |
| 2004/0064463 A1* | 4/2004 | Rao | G06F 16/9027 |
| 2004/0117567 A1* | 6/2004 | Lee | G06F 11/1435 711/154 |
| 2005/0165865 A1* | 7/2005 | Farmer | G06F 16/283 |
| 2005/0177672 A1* | 8/2005 | Rao | G06F 12/0866 711/3 |
| 2011/0066808 A1* | 3/2011 | Flynn | G06F 12/0246 711/118 |
| 2014/0115232 A1* | 4/2014 | Goss | G06F 11/1012 711/103 |
| 2015/0127619 A1* | 5/2015 | Jarvis | G06F 16/2246 707/685 |
| 2016/0154594 A1* | 6/2016 | Kang | G06F 3/0619 711/103 |
| 2017/0024140 A1* | 1/2017 | Shivanand | G06F 3/064 |
| 2017/0300250 A1* | 10/2017 | Sterns | G06F 3/0619 |
| 2017/0344597 A1* | 11/2017 | Wang | G06F 16/182 |
| 2018/0089033 A1* | 3/2018 | Tamura | G06F 11/1451 |
| 2018/0137014 A1* | 5/2018 | Li | G06F 11/1458 |

OTHER PUBLICATIONS

Soares, Livio B. et al., "Meta-data Snapshotting: A Simple Mechanism for File System Consistency", Proceedings of the international workshop on Storage network architecture and parallel I/Os. ACM, Sep. 2003, 12 pages.

* cited by examiner

BACKING UP METADATA

BACKGROUND

The present application relates generally to an improved data processing apparatus and method and more specifically to mechanisms for backing up metadata in a data storage system.

In known data storage systems, data structures are used to describe where user data may be located and how it may be retrieved. Such data structures are known as metadata. Usually, such metadata are mostly stored on disk, with only some parts being held in memory. For performance considerations, updates made to the metadata stored in memory are not immediately performed in respect of the metadata stored on disk, but are rather cached and periodically flushed to disk from memory. Whilst this approach may facilitate improved performance of such data storage systems, it may contribute to metadata inconsistency in the case of a system failure, which may result in some of the metadata remaining unfinished from memory to disk, in order to address this issue, a journal is implemented in order to serve as a record of metadata stored on memory and updates performed in respect thereof. Additionally, and in order to recover from system failures that may cause corruption of the metadata held on disk, such as, for example, disk failure, data storage systems may be configured so that a backup of the metadata stored on disk is performed by collecting snapshots of such metadata at specifiable and regular intervals. Such a backup is sometimes referred to as a metadata snapshot and/or a point-in-time metadata backup.

The occurrence of a system failure may cause a loss of any update information on metadata that is stored only on memory of the storage system and/or also the flushing of updated metadata from memory to disk to be stalled. Accordingly, metadata stored on disk of the storage system is rendered stale and it should, when a system reboot is performed, preferably be manipulated to correspond in update status to the most updated version of metadata stored on memory just before the occurrence of the system failure. Such updating of the stale metadata on disk may be performed by: accessing the journal comprising the most recently recorded updates made to the metadata on memory; comparing the journal entries with back-up snapshots of the corresponding metadata stored on disk; identifying stale metadata on the disk where a discrepancy is recorded between metadata in a given backup, metadata snapshot and corresponding metadata of more current, updated status in a given journal entry; applying changes to such stale metadata thereby to align its status with the more current, updated metadata corresponding thereto in the given journal entry of the journal. This process is referred to as replaying the journal.

There are some challenges associated with known data storage systems. One such challenge is associated with any further updates/changes to the metadata stored on memory being quiesced when a backup of metadata stored on disk is performed. This is done by stopping/blocking any host writes whilst snapshots of the metadata stored on disk are collected. Once such a backup has been completed, host writes may be resumed and any new updates/changes to the metadata written to the memory are recorded in the journal entries of a new, updated journal. Because host writes are stopped/blocked when such a backup is performed, this may contribute to a degradation of the performance characteristics of data storage systems in which such a backup process is used. This issue may be addressed by facilitating host writes to be continued while the backup is performed and storing any updated metadata in an intermediate and relatively large cache before being transferred to memory on completion of the backup. In this solution, the opportunity of continued host writes to be performed during metadata backup may need to be balanced with an increased risk of loss of data on memory, and an increased management and/or storage capacity overhead.

A further challenge is associated with the fact that, whilst the increased data storage capacity of relatively modern storage systems is desirable, this translates to metadata structures of increased size. Some problems associated with such metadata of increased size are that a relatively longer time may be needed both for taking snapshots during backup of such metadata and quiescing host writes when such a backup is performed. These issues may be addressed by breaking down the larger metadata structure(s) into multiple, smaller metadata structures, which may be backed up respectively over a relatively shorter period of time during which host writes would be stopped. However, consideration would need to be given to increased management and/or processing overheads that may be incurred in respect of such multiple, smaller metadata structures.

Accordingly, it is a challenge to mitigate some of the drawbacks associated with known data storage systems.

SUMMARY

In one illustrative embodiment, a method, in a data processing system, is provided for backing up metadata in a data storage system comprising temporary data storage comprising a metadata cache and persistent data storage, which are configurable to store metadata; the data storage system being configurable to: selectively flush metadata from the metadata cache to the persistent data storage; manipulate given metadata stored in the metadata cache in response to a host-write being performed in respect of that metadata; compile a journal comprising respective journal entries in respect of the metadata stored in the metadata cache, and updating a given journal entry in response to a given manipulation of given metadata stored in the metadata cache, corresponding to that journal entry, being performed due to a given host-write, the method comprising: implementing given metadata stored on the data storage system by way of a tree structure operable by fixed mapping, the tree structure comprising respective leaves wherein some leaves are configurable to respectively comprise a predefined range of respective slots with each slot representing a given virtual address in respect of which data is written onto the data storage system in a given host write, the population of a given slot depending on whether a given host write is performed in respect of the virtual address represented by that given slot, and some leaves are allocated to comprise given nodes that are each configurable to point towards a given leaf when accessed; taking a stream of snapshots of leaves in the metadata tree structure of given metadata stored on the persistent data storage, each snapshot of a given leaf being taken at a given time and the overall stream of snapshots comprising a backup of the given metadata stored on the persistent data storage, which is temporally undefined and collected temporally independently in relation to any given active operation of the data storage system; reconstructing the metadata tree structure of the given metadata stored on the persistent data storage on a basis of the stream of snapshots taken for backing up the given metadata stored on the persistent data storage; replaying the journal over the reconstructed metadata tree structure wherein a status of given metadata correspondingly stored on the metadata cache and on the persistent data storage is assessed by comparing, for that given metadata, its corresponding journal entry in the journal with a given leaf corresponding thereto in the reconstructed metadata tree structure, and in response to a given status discrepancy being flagged in respect of any given metadata, the status of a given leaf corresponding thereto in the reconstructed data tree structure is modifiable thereby to make it consistent in status with the corresponding journal entry in the journal for that given metadata. In contrast to previously-proposed backup systems and/or techniques, metadata backup is not done at a specific time and/or does not warrant a system quiesce in accordance with an illustrative embodiment. This is because, whilst each snapshot of a given leaf is taken at a given time, the overall stream of snapshots on which the metadata backup is based is temporally undefined and collected temporally independently in relation to any given active operation of the data storage system, that is, it may be considered to be blurred in time. A further contrast to previously-proposed backup systems and/or techniques is that, host writes may be continued simultaneously with the collection of the metadata backup in accordance with an illustrative embodiment.

In accordance with another embodiment, a system is provided operable to back up metadata stored in a data storage system, the data storage system comprising: at least temporary data storage comprising at least a metadata cache, and at least persistent data storage, which are configurable to store metadata, and the data storage system being operable to: at least selectively flush metadata from the metadata cache to the persistent data storage, and to manipulate given metadata stored in the metadata cache in response to a host-write being performed in respect of that metadata, the system comprising: at least a journal compiler that is configurable to compile a journal comprising respective journal entries in respect of the metadata stored in the metadata cache, the journal compiler being configurable to update a given journal entry of the journal in response to a given manipulation of given metadata in the metadata cache, corresponding to that journal entry, being performed due to a given host-write; at least a metadata manager that is configurable to implement given metadata stored on the data storage system by way of at least a tree structure operable by fixed mapping, the tree structure being implemented thereby to comprise respective leaves wherein, at least some leaves are configurable to respectively comprise a predefined range of respective slots with each slot representing a given virtual address in respect of which data is written onto the data storage system in a given host write, the population of a given slot depending on whether a given host write is performed in respect of the virtual address represented by that given slot, and at least some leaves are allocated to comprise given nodes that are each configurable to point towards at least a given leaf when accessed; at least a snapshot provider that is configurable to take a stream of snapshots of leaves in the metadata tree structure of given metadata stored on at least the persistent data storage, each snapshot of a given leaf being taken at a given time and the overall stream of snapshots taken by the snapshot provider comprising a backup of the given metadata stored on the persistent data storage, such a backup being temporally undefined and collected temporally independently in relation to any given active operation of the data storage system; at least a metadata reconstruction unit that is configurable to reconstruct the metadata tree structure of given metadata stored on the persistent data storage on at least a basis of a given stream of snapshots taken by the snapshot provider; at least a comparator that is configurable to compare at least a status of given metadata correspondingly stored on the metadata. cache and on the persistent data storage, by comparing, for that given metadata, its corresponding journal entry in a given journal compiled by the journal compiler with a given leaf corresponding thereto in a given reconstructed metadata tree structure provided by the metadata reconstruction unit, in response to the given journal being replayed over the given reconstructed metadata tree structure, and at least a leaf modifier that is configurable to modify a status of a given leaf in a given reconstructed data tree structure provided by the metadata reconstruction unit to make it consistent with a status of its corresponding journal entry in a given journal compiled by the journal compiler, such a modification being performed in response to a given status discrepancy being flagged in respect of that given leaf during operation of the comparator.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Within the description, the same reference numerals or signs are used to denote the same parts or the like.

Figure 1:
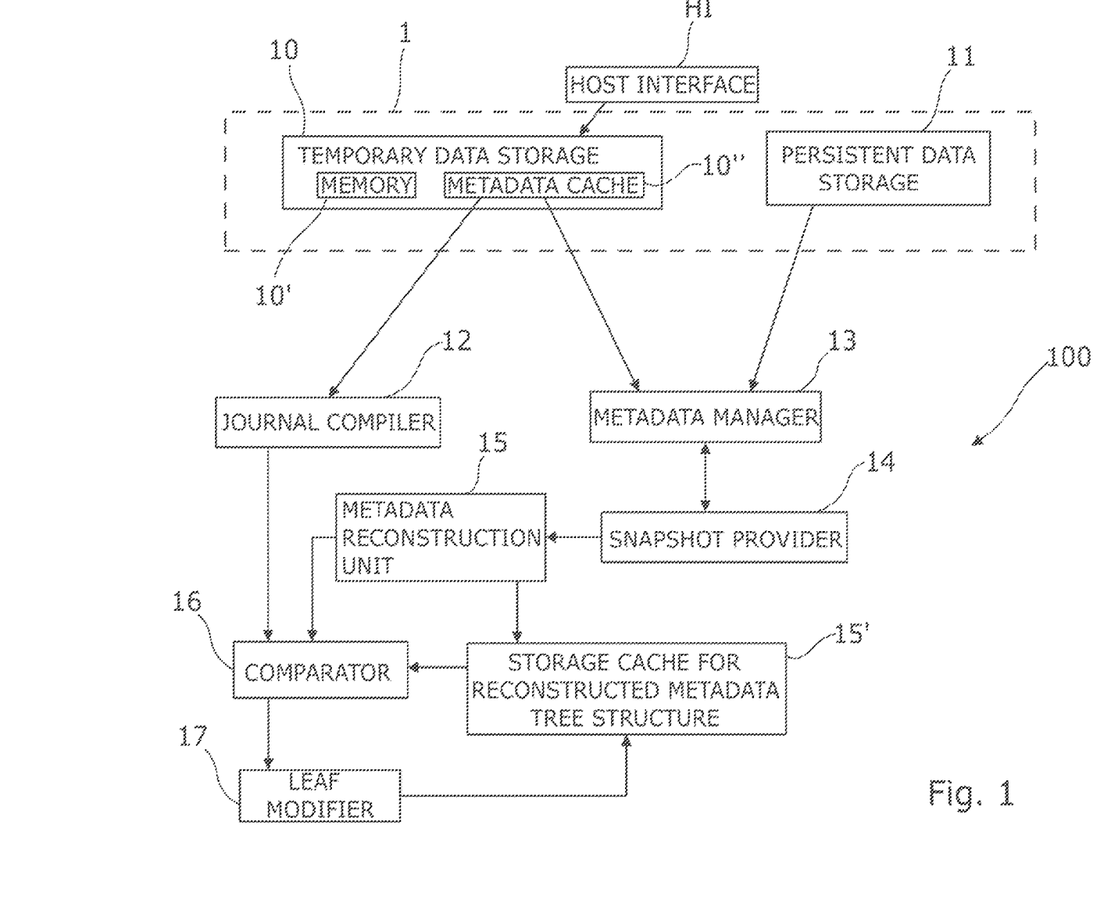
FIG. 1 illustrates an embodiment of a system aspect in accordance with an illustrative embodiment.

Reference is now made to FIG. 1, which illustrates an embodiment of a system aspect 100 that is operable to back up metadata stored on a data storage system. The data storage system 1 comprises at least temporary data storage 10 and at least persistent data storage 11, which are configurable to store metadata corresponding to a given host write performed in respect of the data storage system. The data storage system 1 also comprises a host interface by way of which a host write may be executed. As shown in FIG. 1, the host interface HI is operatively coupled to at least the temporary data storage 10 of the data storage system 1.

The temporary data storage 10 comprises at least a memory 10' for storing metadata corresponding to a host write that is performed in respect of the data storage system 1. The temporary data storage 10 also comprises at least a metadata cache 10", which is operatively coupled to the memory 10' and onto which a copy of metadata stored on the memory 10' is written to and selectively flushed to the persistent data storage 11. In this regard, the metadata cache 10" is operable to flush the metadata to the persistent data storage 11 at specific, configurable times. The metadata cache 10" is operable to facilitate a specific manipulation of, by for example, updating, given metadata stored thereon according to a host write being performed in respect of that given metadata.

The system 100 also comprises a journal compiler 12, which is operatively coupled to the temporary data storage 10, thereby to facilitate compilation of a journal comprising respective journal entries in respect of the metadata stored in the metadata cache 10". In response to a given manipulation being performed in respect of any of the metadata stored on the metadata cache 10", the journal compiler 12 is configurable to accordingly record that update in respect of a given journal entry corresponding to that metadata in the journal.

Also forming a part of the system 100 is a metadata manager 13, which is configurable to implement given metadata stored on the temporary data storage 10 and the persistent data storage 11 by way of at least a tree structure operable by fixed mapping and being implemented thereby to comprise respective leaves. Each leaf of the tree structure is configurable to respectively comprise a predefined range of respective slots. Each slot represents a given virtual address in respect of which data is written onto the data storage system in a given host write. Some of the leaves of the tree structure are allocated to comprise given nodes that are each configurable to point towards at least a given leaf when accessed.

Operatively coupled to the metadata manager 13 is a snapshot provider 14, which is configurable to take a stream of snapshots of only leaves in the metadata tree structure, whilst excluding given nodes, thereby to provide a backup, of given metadata stored on the persistent data storage 11. In contrast to previously-proposed backup systems and/or techniques, metadata backup is not done at a specific time and/or does not warrant a system quiesce in accordance with an illustrative embodiment. This is because, whilst each snapshot of a given leaf is taken at a given time, the overall stream of snapshots on which the metadata backup is based is temporally undefined and collected temporally independently in relation to any given active operation of the data storage system, that is, it may be considered to be blurred in time.

In one embodiment, the snapshot provider 14 is operable such that each snapshot of a given leaf in the metadata tree structure of given metadata stored on at least the persistent data storage 11 may be taken according to at least a predefined criterion. In one mode of operation of the snapshot provider 14, snapshots are taken of leaves that were not recently modified. In this way, such leaves would be represented with relative accuracy whilst facilitating reduced processing and/or management overhead, In another mode of operation, the leaves in the metadata tree structure of given metadata stored on the persistent data storage 11 may be constantly scanned, with snapshots of given leaves being taken one at a time. In this way, a relatively constant backup of given metadata stored on the persistent data storage 11 may be built up, independently of any write patterns.

The system 100 also comprises a metadata reconstruction unit 15 operatively coupled to the snapshot provider 14. It is configurable to reconstruct the metadata tree structure of given metadata stored on the persistent data storage 11 on at least a basis of the stream of snapshots taken by the snapshot provider 14. In respect of the reconstructed metadata tree structure provided by the metadata reconstruction unit 15, it may be stored in a storage cache 15', which may be inbuilt as a part of the metadata reconstruction unit 15 or provided separately therefrom as shown in FIG. 1. Alternatively, it may be provided as a part of the persistent data storage 11. The metadata reconstruction unit 15 may be operable to restore given nodes, Which were excluded for the purpose of collecting the stream of snapshots, in the reconstructed metadata tree structure pertaining to the persistent data storage.

The system 100 also comprises a comparator 16 that is operatively coupled to the journal compiler 12 and to the metadata reconstruction unit 15. It is configurable to compare at least a status of given metadata correspondingly stored on the metadata cache 10" and on the persistent data storage 11, by comparing, for that given metadata, its corresponding journal entry in a given journal compiled by the journal compiler 12 with a given leaf corresponding thereto in a given reconstructed metadata tree structure provided by the metadata reconstruction unit 15, Such a comparison is performed in response to the given journal being replayed over the given reconstructed metadata tree structure.

Also provided as a part of the system 100 is a leaf modifier 17 that is configurable to modify a status of a given leaf in a given reconstructed data tree structure provided by the metadata reconstruction unit 15 to make it substantially consistent with a status of its corresponding journal entry in a given journal compiled by the journal compiler 12. Such a modification is performed in response to a given status discrepancy being flagged in respect of that given leaf during operation of the comparator 16. As can be seen from FIG. 1, the leaf modifier 17 is operatively coupled to the comparator 16 and also to the storage cache 15' holding given reconstructed metadata tree structures provided by the metadata reconstruction unit 15.

An embodiment of a system aspect 100 described with reference to FIG. 1 is configurable to perform the steps of an embodiment of a method aspect 200 as hereinafter described with reference to FIG. 2.

Figure 2:
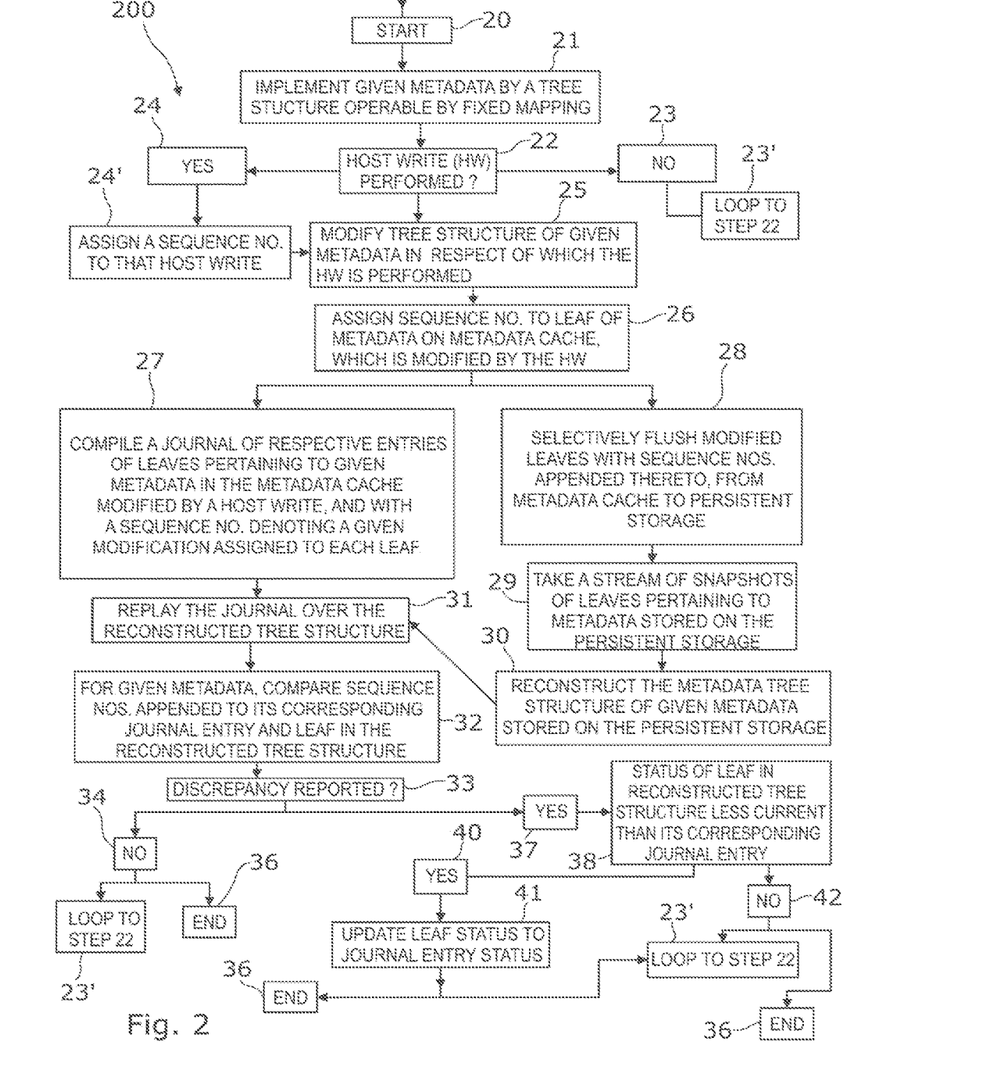
FIG. 2 is a flowchart of an embodiment of a method aspect in accordance with an illustrative embodiment.

Turning to FIG. 2, an embodiment of a method aspect 200 is begun at block 20. Following on from there, at block 21, a given structure of any given metadata stored on at least the metadata cache 10" of the temporary data storage 10 and the persistent data storage 11 is implemented by a tree structure operable by fixed mapping. The metadata manager 13 shown in FIG. 1 is operable according to block 20 in order to structurally implement the tree structure of any given metadata as previously described with reference to FIG. 1.

At block 22, it is determined whether a host write has been performed via the host interface 141 in respect of any given metadata stored on at least the metadata cache 10". If, in response to a step according to block 22 being executed, no new host write report is generated at block 23, no further action is taken and a loop may be performed to block 22, after a selectable time, via block 23'. Alternatively, if, in response to the execution of a. step according to block 22, a new host write report is generated at block 24 for a given host write performed in respect of given metadata stored on the metadata cache 10", a given sequence number is generated in respect of that given host write at a subsequent block 24'. A modification corresponding to a given host write being performed in respect of given metadata stored on the data storage system is performed at block 25. In this regard, at block 26, any given sequence number generated in respect of a given host write at block 24' is appended to a given leaf pertaining to metadata stored in the metadata cache 10", which is correspondingly modified by that given host write. In one embodiment, the metadata manager 13 shown in FIG. 1 may be operable to execute the steps of any one of blocks 24', 25 and 26.

At block 27, a journal is compiled by the journal compiler 12 shown in FIG. 1, in respect of any given leaf pertaining to metadata stored in the metadata cache 10", which is modified by the performance of a given host write.

At block 28, the data storage system 1 is operable to selectively flush any leaf modification according to step 26, which corresponds with a given host write, from the metadata cache 10" to the persistent data storage 11. In one embodiment, this may be done at specifiable time intervals.

At block 29, a stream of snapshots is taken only of respective leaves, whilst excluding given nodes, in the tree structure of given metadata stored on the persistent data storage 11, with each snapshot of a given leaf including a given sequence number denoting a given modification of the given leaf by a given host write. In one embodiment, the snapshot provider 14 shown in FIG. 1 may be operable to execute a step according to block 29.

At block 30, the metadata tree structure of given metadata stored on the persistent data storage 11 is reconstructed on at least a basis of the stream of snapshots taken at block 29. At block 30, the given nodes that were previously-excluded for the purpose of collecting the stream of snapshots are restored in the reconstructed metadata tree structure. The metadata reconstruction unit 15 shown in FIG. 1 may be operable in this regard to execute a step according to block 30.

At block 31, the journal generated at block 27 is replayed over the reconstructed metadata tree structure generated at block 30. Following on from there, at block 32, for given metadata, a comparison is made of its respective journal entry and a given leaf corresponding thereto in the reconstructed metadata tree structure. In this regard, the comparator 16 described with reference to FIG. 1 may be operable to execute steps according to any one of block 31 and block 32.

In response to a step according to block 32 being performed, a status discrepancy report is generated at block 33. In response to no discrepancy being reported in respect of the journal and the reconstructed metadata tree structure at block 34, either a loop is performed back to step 23' or progress is made to block 36 which marks the end of any steps according to one embodiment.

At block 37, a discrepancy is reported for given metadata, in respect of the sequence number respectively assigned to a given leaf corresponding thereto in the reconstructed metadata tree structure and its corresponding journal entry in the journal. In this regard, at block 38, the sequence number respectively assigned, in respect of that given metadata, to the leaf corresponding thereto and its corresponding journal entry in the journal is investigated. If, in response to such an investigation, it is found that, for given metadata, the sequence number assigned to its corresponding leaf in the reconstructed tree structure is less current in status compared to that appended to its corresponding journal entry in the journal, then this is reported at block 40. Subsequently, at block 41, such a leaf is updated to be consistent in status with the journal entry. In one embodiment such an update may be executed by the leaf modifier 17 described with reference to FIG. 1.

If, in response to the investigation conducted at block 38, it is found that, for given metadata, the sequence number assigned to its corresponding leaf in the reconstructed tree structure is more current in status compared to that appended to its corresponding journal entry in the journal at block 42, then the leaf status is left unaltered.

As can be seen from FIG. 2, after blocks 42 and 41, one embodiment may be progressed to block 23' or to block 36 as described hereinabove.

Figure 3:
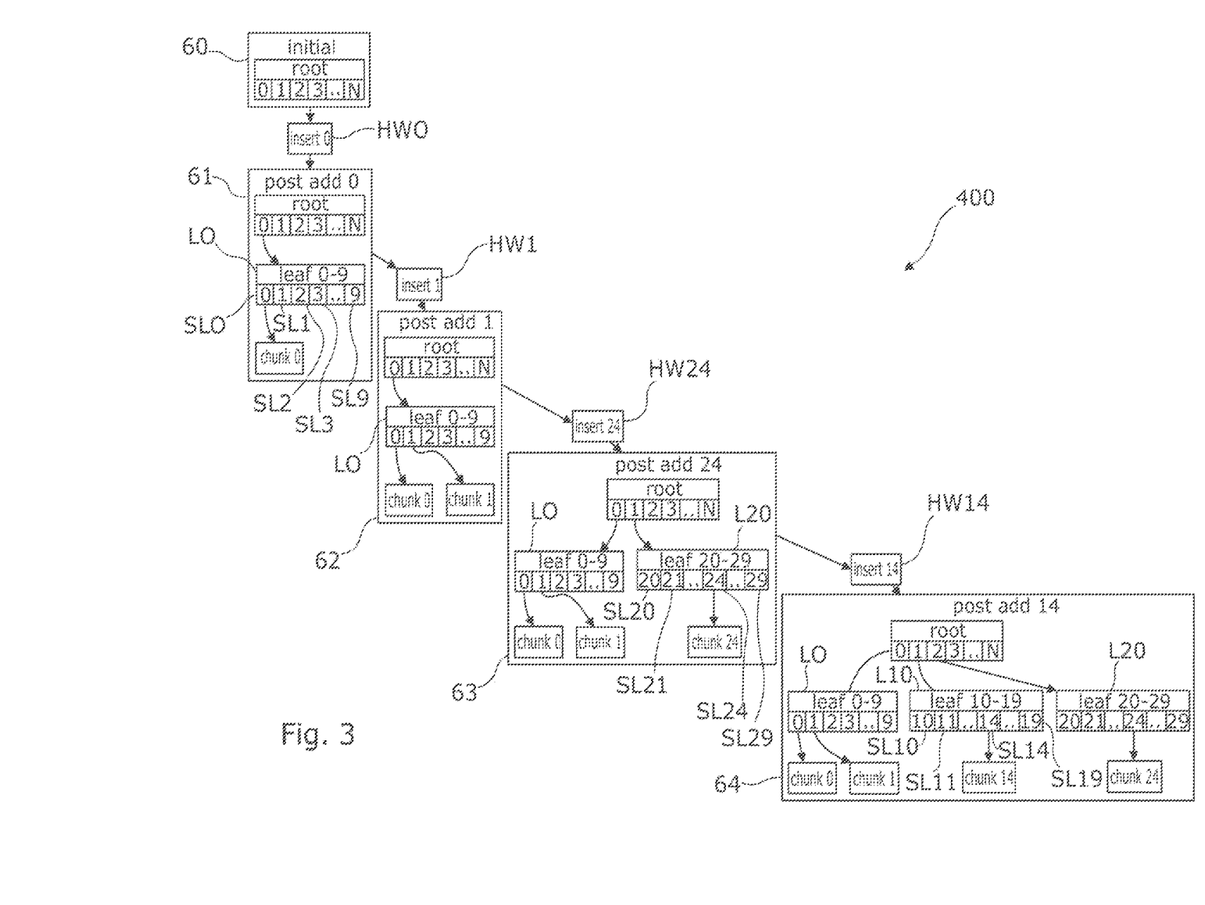
FIG. 3 illustrates an example of a metadata tree structure operable by fixed mapping in accordance with an illustrative embodiment.

Reference is now made to FIG. 3, which illustrates an example of a metadata tree structure 400 operable by fixed mapping in accordance with an illustrative embodiment. The metadata tree structure 400 comprises respective leaves L. Each leaf L is configurable to respectively comprise a predefined range of respective slots SL. Each slot SL represents a given virtual address in respect of which data is written onto the data storage system 1 in a given host write HW. By way of example, and in order to illustrate fixed mapping in respect of one embodiment, each leaf L of the metadata tree structure 400 is chosen to comprise 10 slots that cover a fixed, virtual address range of 10. In one embodiment, the metadata manager 13 may be configurable to structurally implement the metadata stored on the metadata cache 10" and on the persistent data storage 11 according to a metadata tree structure 400 as shown in FIG. 3.

To begin with, and as can be clearly seen from block 60 in FIG. 3, the metadata tree structure 400 is empty since it only has a single root node and no leaves L. In response to a host write HW0 being performed for inserting a given virtual address 0 into the metadata tree structure 400, a leaf L0 is added to the metadata tree structure 400, comprising a range of respective slots SL0 to SL9 at block 61. The given virtual address 0 is stored in its corresponding slot SL0 as chunk 0.

In response to a subsequent host write HW1 being performed for inserting a given virtual address 1 into the metadata tree structure 400, the leaf L0 already comprises a slot SL1 corresponding to that given virtual address 1. So, given virtual address 1 is stored in its corresponding slot SL1 as chunk 1. Thus, at block 62, the metadata tree structure 400 is unchanged. The status of the metadata tree structure 400 at block 62 is that: the leaf L0 has slots SL0, SL1, respectively populated with chunk 0 and chunk 1, corresponding to given virtual addresses 0, 1 inserted into the metadata tree structure 400, due to given host writes HW0, HW1 being performed.

In response to a subsequent host write HW24 being performed for inserting a given virtual address 24, the metadata tree structure 400 is structurally altered at block 63. This is done because there is no slot corresponding to that given virtual address 24 in leaf L0. Such an alteration comprises the enhancement of the metadata tree structure 400 to include a newly-created leaf L20 having a given slot SL24 corresponding to that given virtual address 24. So, the given virtual address 24 is stored in its corresponding slot SL24 as chunk 24 in newly-created leaf L20.

In response to a still subsequent host write HW14 being performed for inserting a given virtual address 14, the metadata tree structure 400 is structurally altered again at block 64. This is done because there is no slot corresponding to that given virtual address 14 in any of the currently, existing leaves L0, L20 of the metadata tree structure 400. Such an alteration comprises a further enhancement of the metadata tree structure 400 to include a newly-created leaf L10 having a given slot SL14 corresponding to that given virtual address 14. So, the given virtual address 14 is stored in its corresponding slot SL14 as chunk 14 in newly-created leaf L10.

As generally explained with reference to FIG. 3, fixed mapping is used in respect of a metadata tree structure 400 in accordance with an illustrative embodiment. In this regard, and in the absence of a leaf L comprising a given slot SL, representing a given virtual address in respect of which a given host write HW is performed, such a virtual address is not stored in an existing slot SL of any given existing leaf L. Instead, a structural alteration of the metadata tree structure 400 is performed such that a new leaf L comprising a given slot SL corresponding with that given virtual address is added to the metadata tree structure 400. So, the population of a given slot SL depends on whether a given host write HW is performed in respect of the virtual address represented by that given slot SL. Otherwise, it remains empty.

In one embodiment, a given virtual address in respect of which data is written in a given host write HW is accessible, in its entirety, from one given leaf L of the metadata tree structure 400 of given metadata stored on at least the persistent data storage 11. Leaf-splitting is not performed in the event that a given leaf is filled, which is in contrast to other tree-implementation techniques, such as b-tree implementations. Furthermore, in one embodiment, given leaves L may be perceived as tables that cover a fixed, predefined virtual space and that are never split. Thus, they can be copied with relatively low processing and/or management overhead whilst facilitating future recovery of metadata with increased accuracy and ease.

In one embodiment, at least a size of respective leaves in the metadata tree structure of given metadata stored on the data storage system is selected in order to facilitate flushing of given metadata pertaining to a given leaf, at least from the metadata cache 10" to the persistent data storage 11, substantially with single atomicity. In this regard, the size of respective leaves is selected such that they fit the underlying storage block size and they can he flushed from at least the metadata cache 102 to the persistent data storage 11 in a single atomic write.

Figure 4:
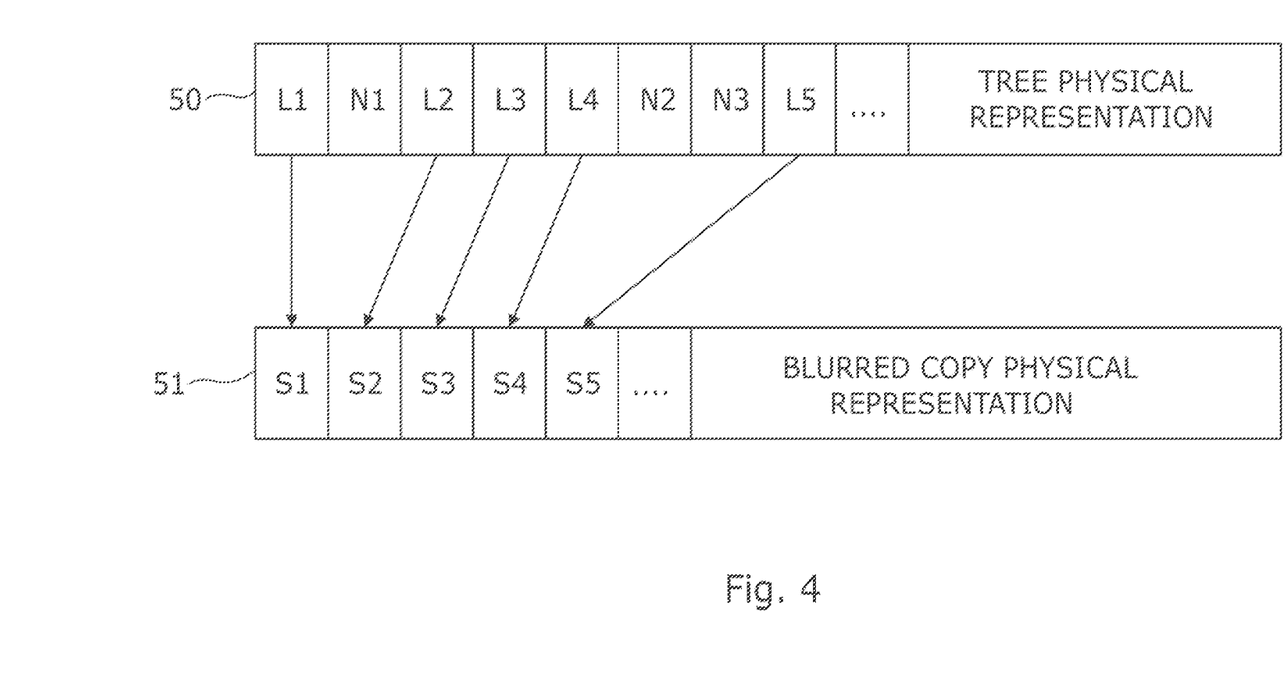
FIG. 4 illustrates how a backup of metadata stored on the persistent data storage is collected in accordance with an illustrative embodiment.

Generally, the metadata tree structure of given metadata stored in the metadata cache 10" and the persistent data storage 11 comprises respective leaves L, as hereinbefore described with reference to FIG. 3, and given nodes N that are each configurable to point towards at least a given leaf L when accessed. In this regard, reference is now made to FIG. 4 which illustrates how a backup of metadata stored on the persistent data storage 11 is collected in accordance with an illustrative embodiment. In the example of FIG. 4, the metadata tree structure 50 of given metadata stored on the persistent data storage 11 comprises respective leaves LX and given nodes N where X is any integer in the range 1 to X and correlates a given leaf LX with its corresponding snapshot SX. At block 29 in FIG. 2, the snapshot provider 14 shown in FIG. 1, is operable to take a stream of snapshots SX of only the leaves LX in the metadata tree structure 50 of given metadata stored in the persistent data storage 11. So, in the example shown in FIG. 4, reference numerals S1, S2, S3, S4 and S5 denote respective snapshots of leaves L1, L2, L3, L4, L5, of the metadata tree structure 50 pertaining to the persistent data storage 11. The stream of snapshots Si, S2, S3, S4, S5 comprises a backup 51 of given metadata stored on the persistent data storage 11. In contrast to previously-proposed backup systems and/or techniques, metadata backup is not done at a. specific time and/or does not warrant a system quiesce in one embodiment. This is because, whilst each snapshot S1, S2, S3, S4, S5 of a given leaf L1, L2, L3, L4, L5, is taken at a given time, the overall stream of snapshots on which the metadata backup 51 is based is temporally undefined and collected temporally independently in relation to any given active operation of the data storage system 1, that is, it may be considered to be blurred in time. For the purpose of collecting the backup 51 of given metadata stored on the persistent data storage 11, snapshots SX are only taken of the leaves LX. As can be clearly seen from FIG. 4, no snapshots are taken of given nodes N1, N2, N3, serving as pointers to given leaves LX in the metadata tree structure 50. In this way, storage capacity may be utilised with increased efficiency since snapshots SX of leaves LX occupy relatively less storage space than of given nodes N1, N2, N3 serving as pointers to such leaves LX.

Figure 5:
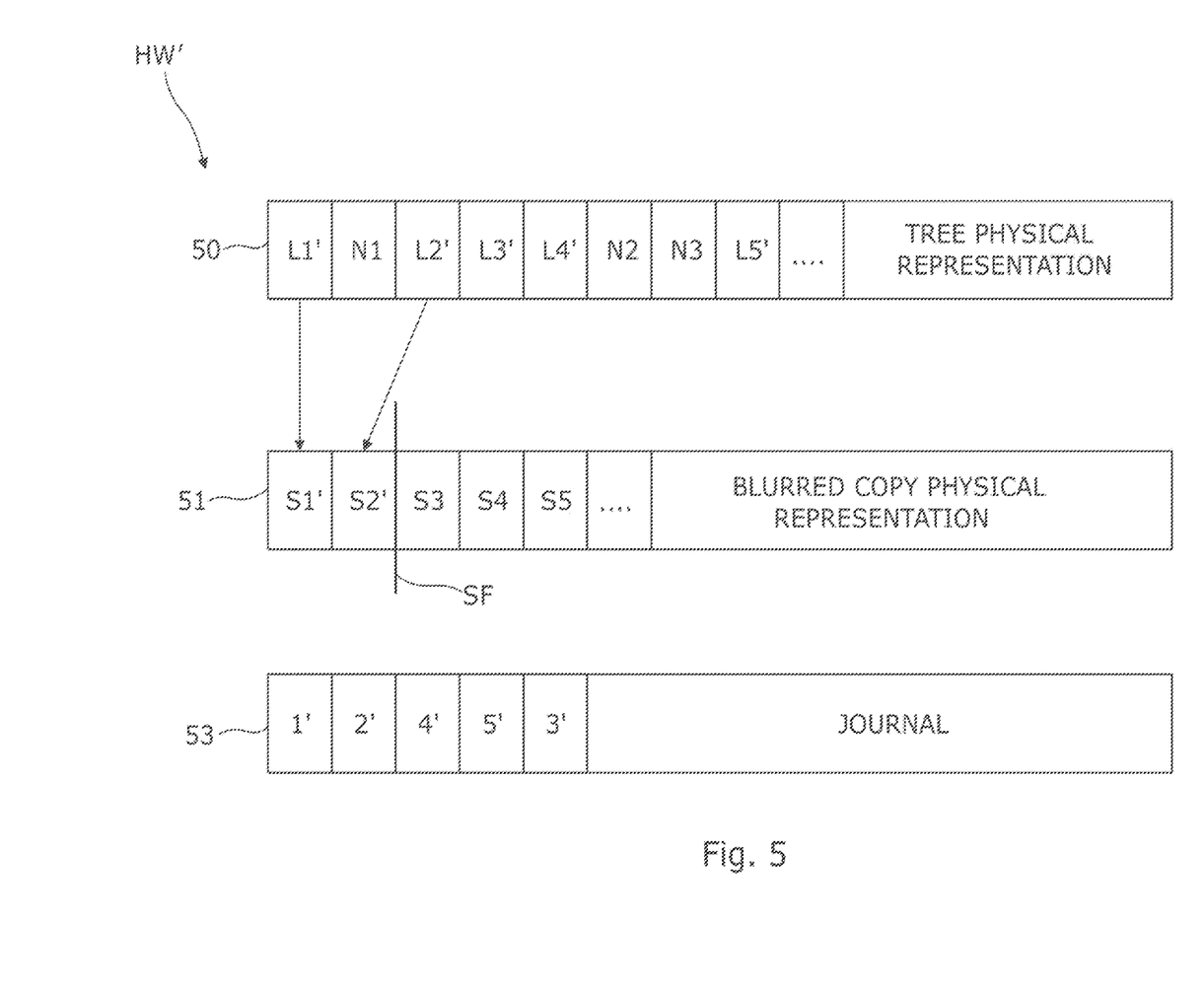
FIG. 5 illustrates a given operation of an embodiment when a system failure occurs in accordance with an illustrative embodiment.

Reference is now made to FIG. 5, which illustrates a given operation of one embodiment, corresponding to steps performed according to block 22 through to block 29 in FIG. 2, by at least the journal compiler 12, metadata manager 13, and snapshot provider 14 shown in FIG. 1.

Referring to FIG. 5, in response to a given host write HW' being performed in respect of given metadata stored in the metadata cache 10", a corresponding sequence number and/or update notation ' is assigned to that given host write HW'. Such operation of one embodiment corresponds to block 24' shown in FIG. 2 and may be performed by the metadata manager 13 shown in FIG. 1. In response to such a given host write HW' being performed, the tree structure of the metadata stored in at least the metadata cache 10" is modified accordingly at block 25 of FIG. 2. This is effectuated, at block 26 in FIG. 2, by assigning the given update notation to any leaves in the metadata tree structure of given metadata stored in the metadata cache 10" that are correspondingly modified by the host write HW'. Any modified leaves are selectively flushed from the metadata cache 10" to the persistent data storage 11 at block 28 of FIG. 2. In the example of FIG. 5, the modifications flushed from the metadata cache 10" pertain to leaves L1, L2, L3, L4, L5, which are seen as modified with the update notation to ' to L1', L2', L3', L4', L5', in a physical representation 50 of the metadata tree structure of given metadata stored on the persistent data storage 11.

Following on, the snapshot provider 14 shown in FIG. 1 is operable to take a stream of snapshots 51 of the modified metadata tree structure pertaining to the persistent data storage 11, as done at block 29 of FIG. 2. As can be seen, snapshots S1', S2' of modified leaves L1', L2' are taken, after which the occurrence of a system failure SF prevents further snapshots of modified leaves L3', L4', L5' to be acquired. Thus, reconstructing the metadata tree structure of given metadata stored on the persistent data storage 11 on at least a basis of the current status of the stream of snapshots 51 would yield inaccurate results since the updated status of given leaves L3', L4', L5' was not duly recorded by the snapshot provider 14 due to the occurrence of the system failure SF.

FIG. 5 also illustrates a journal 53 that is compiled in respect of the metadata stored in the metadata cache 10". Given journal entries that are modified in response to the host write HW' being performed, are accordingly updated with the update notation denoting such a modification. So, in the example of FIG. 5, the modified journal entries 1', 2', 4', 5', 3' pertain to modified leaves L1', L2', L3', L4', L5' in the metadata cache 10". Compilation of the journal 53 and/or manipulation of any one of the journal entries in response to a given host write HW being performed in respect of given metadata stored in the metadata cache 10" may be done by the journal compiler 12 shown in FIG. 1 by being operated according to block 27 in FIG. 2.

Figure 6:
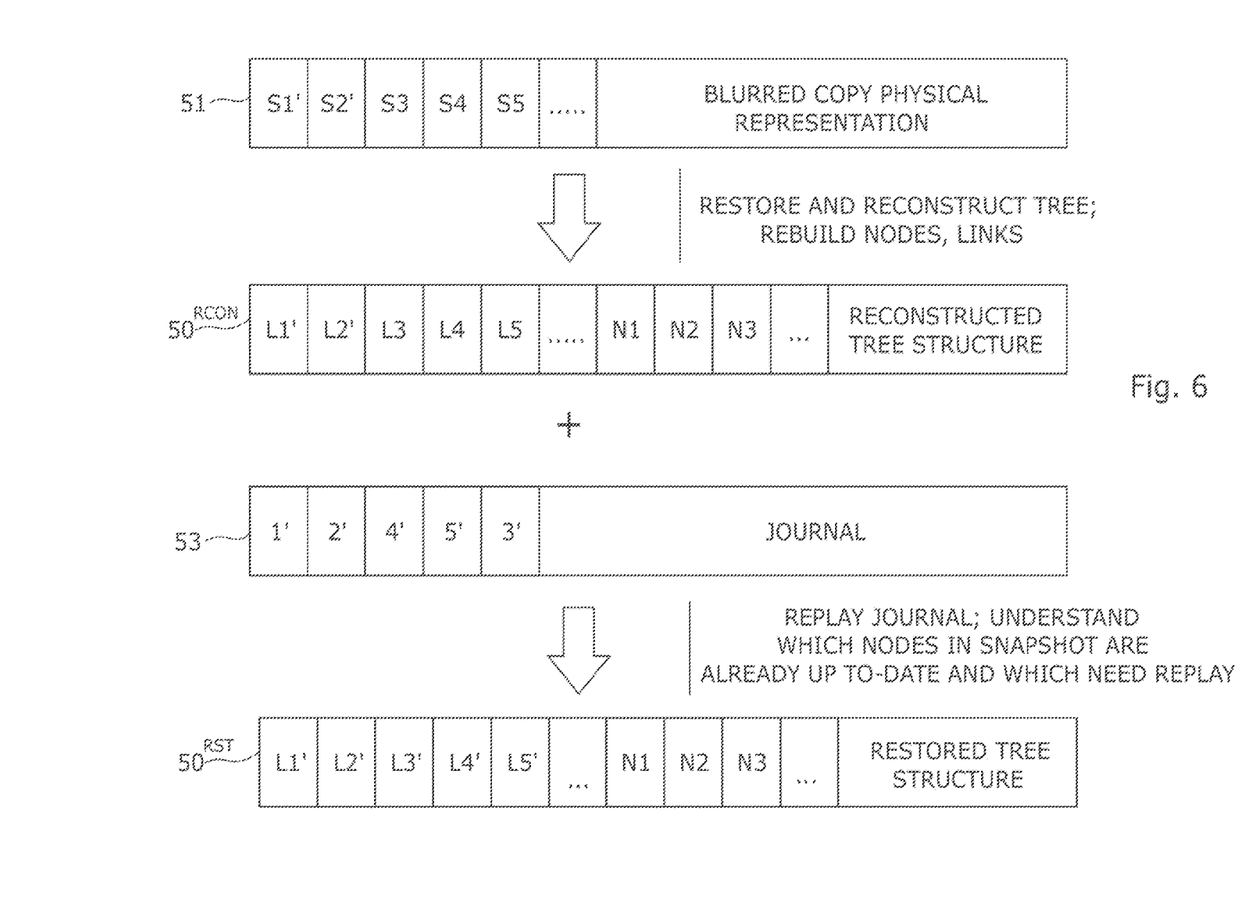
FIG. 6 illustrates a given operation for recovering metadata in the event that a system failure occurs in accordance with an illustrative embodiment.

FIG. 6 illustrates a given operation of one embodiment for recovering metadata in the event that a system failure occurs. In the following description, appropriate reference will be made to corresponding steps performed according to block 30 through to block 41 in FIG. 2, by at least the metadata reconstruction unit 15, comparator 16, and leaf modifier 17 shown in FIG. 1.

According to block 30 in FIG. 2, the metadata reconstruction unit 15 is operable to reconstruct the physical representation 50 of the metadata tree structure of given metadata stored on the persistent data storage 11, on at least a basis of the stream of snapshots 51 taken at block 29. In the present example, such a reconstructed metadata tree structure 50RCON does not contain updated information since the updated status of given leaves L3', L4', L5' pertaining to given metadata of the persistent data storage 11 was not duly recorded by the snapshot provider 14 due to the occurrence of the system failure SF. From FIG. 6, it can be seen that given nodes N1, N2, N3 serving as pointers to given leaves are restored in the reconstructed metadata tree structure 50RCON.

According to block 31 in FIG. 2, the journal 53 generated at block 27 is replayed over the reconstructed metadata tree structure 50RCON generated as above-described. Following on from there, according to block 32 in FIG. 2, for given metadata, a comparison is made of its respective journal entry and a given leaf corresponding thereto in the reconstructed metadata tree structure 50RCON. In this regard, the comparator 16 described with reference to FIG. 1 may be operable to execute steps according to any one of block 31 and block 32 in FIG. 2.

In response to a step according to block 32 in FIG. 2 being performed, a status discrepancy report is generated at block 33. In one scenario, no discrepancy is reported at block 34 in FIG. 2 when a respective update status of a given journal entry 1', 2' of the journal 53 and a given leaf L1', L2' corresponding thereto in the reconstructed metadata tree structure 50RCON is the same.

In one variation of another scenario, a discrepancy is reported at block 37 of FIG. 2, in respect of the sequence number and/or update notation respectively assigned to a given leaf in the reconstructed metadata tree structure 50RCON and its corresponding journal entry in the journal 53. In the example of FIG. 6, such a discrepancy report would be generated at block 40 in FIG. 2 in respect of leaves L3, L4, L5 in the reconstructed metadata tree structure 50RCON since they are of less current status compared to the journal entries, 3', 4', 5', corresponding thereto in the journal 53. In this regard, at block 41 of FIG. 2, such leaves L3, L4, L5 are duly updated to L3', L4', L5, thereby to be substantially consistent with their corresponding journal entry 3', 4', 5'. In another variation, in response to the discrepancy being reported in respect of a given status of any given leaf in the reconstructed tree structure 50RCON being more current in status compared to its corresponding journal entry in the journal 53 at block 42, then the leaf status is left unaltered. In this regard, the leaf modifier 17 may be operable to perform steps 40 and 41.

It can be seen from FIG. 6 that the restored metadata tree structure 50RST of the metadata stored on the persistent data storage 11 reflects any modification due to a given host write HW' despite the occurrence of a system failure SF.

in one embodiment, a given status of a journal entry and/or a corresponding leaf in the metadata tree structure of metadata stored on the data storage system 1 may be denoted by: a given sequence number, update notation and timestamp, taken either individually or in any appropriate combination.

The illustrative embodiments have been described above purely by way of example and modifications of detail can be made within the scope of the illustrative embodiments.

Each feature disclosed in the description, and where appropriate, the claims and/or the drawings may be provided independently or in any appropriate combination.

What is claimed is:

1. A method of backing up metadata in a data storage system comprising temporary data storage comprising a metadata cache and persistent data storage, which are configurable to store metadata; the data storage system being configurable to: selectively flush metadata from the metadata cache to the persistent data storage; manipulate given metadata stored in the metadata cache in response to a host-write being performed in respect of that metadata; compile a journal comprising respective journal entries in respect of the metadata stored in the metadata cache, and update a given journal entry in response to a given manipulation of given metadata stored in the metadata cache, corresponding to that journal entry, being performed due to a given host-write, the method comprising:

implementing given metadata stored on the data storage system by way of a metadata tree structure operable by fixed mapping, the metadata tree structure comprising respective leaves wherein some leaves are configurable to respectively comprise a predefined range of respective slots with each slot representing a given virtual address in respect of which data is written onto the data storage system in a given host write, a population of a given slot depending on whether a given host write is performed in respect of the virtual address represented by that given slot, and some leaves are allocated to comprise given nodes that are each configurable to point towards a given leaf when accessed;

taking a stream of snapshots of leaves in the metadata tree structure of given metadata stored on the persistent data storage, each snapshot of a given leaf being taken at a given time and the overall stream of snapshots comprising a backup of the given metadata stored on the persistent data storage, which is temporally undefined and collected temporally independently in relation to any given active operation of the data storage system;

reconstructing the metadata tree structure of the given metadata stored on the persistent data storage on a basis of the stream of snapshots taken for backing up the given metadata stored on the persistent data storage;

replaying the journal over the reconstructed metadata tree structure wherein a status of given metadata correspondingly stored on the metadata cache and on the persistent data storage is assessed by comparing, for that given metadata, its corresponding journal entry in the journal with a given leaf corresponding thereto in the reconstructed metadata tree structure; and in response to the comparison flagging a given status discrepancy in respect of any given metadata, the status of a given leaf corresponding thereto in the reconstructed data tree structure is modifiable thereby to make it consistent in status with the corresponding journal entry in the journal for that given metadata.

2. The method of claim 1, wherein the given nodes are substantially excluded in respect of taking the stream of snapshots for backing up the given metadata stored on the persistent storage and they are restored in the reconstructed metadata tree structure pertaining to the persistent data storage.

3. The method of claim 1, wherein a given virtual address in respect of which data is written in a given host write is accessible, in its entirety, from one given leaf of the metadata tree structure of given metadata stored on the persistent storage system.

4. The method of claim 1, wherein a size of respective leaves in the metadata tree structure of given metadata stored on the data storage system is selected in order to facilitate flushing of given metadata pertaining to a given leaf, from the metadata cache to the persistent data storage, with substantially single atomicity.

5. The method of claim 1, further comprising:
assigning a sequence number to a given modification of a given metadata tree structure of the data storage system due to a given host write being performed.

6. The method of claim 1, further comprising:
in response to a given host write being performed in respect of given metadata, assigning a sequence number to its corresponding journal entry in the journal and also to any leaf of a given metadata tree structure of the data storage system that is accordingly modified.

7. The method of claim 1, further comprising:
selectively flushing any given leaf modified by a given host write, from the metadata cache to persistent data storage, with a sequence number corresponding to that given host write appended thereto.

8. The method of claim 1, wherein in the replaying of the journal over the reconstructed metadata tree structure, a comparison is performed of sequence numbers respectively assigned to any given leaf in the reconstructed metadata tree structure and its corresponding journal entry in the journal.

9. The method of claim 1, wherein, in response to a sequence number assigned to a given leaf in the reconstructed metadata tree structure being of a less current status than an sequence number assigned to its corresponding journal entry in the journal, the given leaf is modifiable so that its status is updated to that of its corresponding journal entry.

10. The method of claim 1, wherein, in respect of taking the stream of snapshots of leaves in the metadata tree structure of given metadata stored on the persistent data storage, each snapshot of a given leaf is selectable to be taken according to a predefined criterion.

11. A system operable to back up metadata stored in a data storage system, the data storage system comprising: temporary data storage comprising a metadata cache, and persistent data storage, which are configurable to store metadata, and the data storage system being operable to: selectively flush metadata from the metadata cache to the persistent data storage, and to manipulate given metadata stored in the metadata cache in response to a host-write being performed in respect of that metadata, the system comprising:
a journal compiler that is configurable to compile a journal comprising respective journal entries in respect of the metadata stored in the metadata cache, the journal compiler being configurable to update a given journal entry of the journal in response to a given manipulation of given metadata in the metadata cache, corresponding to that journal entry, being performed due to a given host-write;
a metadata manager that is configurable to implement given metadata stored on the data storage system by way of a metadata, tree structure operable by fixed mapping, the metadata tree structure being implemented thereby to comprise respective leaves wherein, some leaves are configurable to respectively comprise a predefined range of respective slots with each slot representing a given virtual address in respect of which data is written onto the data storage system in a given host write, a population of a given slot depending on whether a given host write is performed in respect of the virtual address represented by that given slot, and some leaves are allocated to comprise given nodes that are each configurable to point towards a given leaf when accessed;
a snapshot provider that is configurable to take a stream of snapshots of leaves in the metadata tree structure of given metadata stored on the persistent data storage, each snapshot of a given leaf being taken at a given time and the overall stream of snapshots taken by the snapshot provider comprising a backup of the given metadata stored on the persistent data storage, such a backup being temporally undefined and collected temporally independently in relation to any given active operation of the data storage system;
a metadata reconstruction unit that is configurable to reconstruct the metadata tree structure of given metadata stored on the persistent data storage on a basis of a given stream of snapshots taken by the snapshot provider;
a comparator that is configurable to compare a status of given metadata correspondingly stored on the metadata cache and on the persistent data storage, by comparing, for that given metadata, its corresponding journal entry in a given journal compiled by the journal compiler with a given leaf corresponding thereto in a given reconstructed metadata tree structure provided by the metadata reconstruction unit, in response to the given journal being replayed over the given reconstructed metadata tree structure; and
a leaf modifier that is configurable to modify a status of a given leaf in a given reconstructed data tree structure provided by the metadata reconstruction unit to make it consistent with a status of its corresponding journal entry in a given journal compiled by the journal compiler, such a modification being performed in response to the comparison flagging a given status discrepancy in respect of that given leaf during operation of the comparator.

12. The system of claim 11, wherein, in respect of the given nodes: the snapshot provider is operable to substantially exclude them in respect of taking the stream of snapshots to back up given metadata stored on the persistent storage, and the metadata reconstruction unit is operable to restore them in the reconstructed metadata tree structure pertaining to the persistent data storage.

13. The system of claim 11, wherein the metadata manager is operable to facilitate accessibility to a given virtual address in respect of which data is written in a given host write, in its entirety, from one given leaf of the metadata tree structure of given metadata stored on the persistent storage system.

14. The system of claim 11, wherein the metadata manager is operable to facilitate selection of a size of respective leaves in the metadata tree structure of given metadata stored on the data storage system in order to facilitate flushing of given metadata pertaining to a given leaf, from the metadata cache to the persistent data storage, with substantially single atomicity.

15. The system of claim 11, wherein the metadata manager is operable to assign a sequence number to a given modification of a given metadata tree structure of the data storage system due to a given host write being performed.

16. The system of claim 11, wherein, for a given host write being performed in respect of given metadata, a given sequence number is assigned: by the journal compiler, to the journal entry corresponding to that given metadata, and by the metadata manager, to any leaf of a given metadata tree structure of the data storage system that is accordingly modified.

17. The system of claim 11, wherein the metadata cache is operable to selectively flush any given leaf modified by a given host write, with a sequence number corresponding to that modification appended thereto, to persistent data storage.

18. The system of claim 11, wherein the comparator is operable to perform a comparison of sequence numbers respectively assigned to any given leaf in the reconstructed metadata tree structure and its corresponding journal entry in the journal.

19. The system of claim 11, wherein the leaf modifier is operable to facilitate modification of a given leaf in the reconstructed metadata tree structure so that its status is updated to that of its corresponding journal entry, in response to a sequence number assigned to that given leaf being flagged as having a less current status than a sequence number assigned to its corresponding journal entry in the journal during operation of the comparator.

20. The system of claim 11, wherein the snapshot provider is operable to take the stream of snapshots of leaves in the metadata tree structure of given metadata stored on the persistent data storage, each snapshot of a given leaf being selectable to be taken according to a predefined criterion.

* * * * *